United States Patent Office 3,770,808
Patented Nov. 6, 1973

3,770,808
ALKYLOXY ACETIC ACID ESTERS
Edward Thomas Marquis, Austin, and Walter Howe Brader, Jr., Houston, Tex., assignors to Jefferson Chemical Company, Inc., Houston, Tex.
No Drawing. Filed Nov. 3, 1971, Ser. No. 195,448
Int. Cl. C07c 69/66
U.S. Cl. 260—484 R
2 Claims

ABSTRACT OF THE DISCLOSURE

Alkyloxy acetic acid esters are useful lubricants and lubricant additives.

BACKGROUND OF THE INVENTION

Field of the invention

The invention pertains to new organic chemicals.

Description of the prior art

Synthetic lubricants are described in the Federal Government's Report PB111, 565 by W. E. McTurk. The alkyloxy acetic acid esters of our invention have improved low temperature flow characteristics and lower freezing points and pour points compared to known lubricants.

SUMMARY OF THE INVENTION

Alkyloxy acetic acid esters of the formula

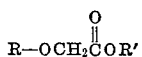

wherein R is an alkyl group of 1 to 20 carbon atoms and R' is an alkyl or aryl residue from a di, tri, or poly functional alcohol are useful lubricants and lubricant additives.

DESCRIPTION OF THE PREFERRED EMBODIMENTS

Our invention is alkyloxy acetic acid esters which have superior low temperature flow properties, low freezing points and good viscosity-temperature relationships. These esters also have outstanding high temperature stability and low volatility at high temperatures. The alkyloxy acetic acid esters of our invention are prepared by reacting an alkyl oxyacetic acid, for example ethoxy acetic acid, butoxy acetic acid, hexyloxy acetic acid or octyloxy acetic acid with alcohols, for example neo-pentyl glycol, glycerol, polyethylene glycols, polypropylene glycols, sucrose, trimethylolpropane or pentaerythritol. The following examples illustrate the preparation of the esters of our invention but are not to be construed as limitative.

EXAMPLE 1

Butoxy acetic acid (39.6 g., 0.3 mole) was heated with neopentyl glycol (31.2 g., 0.3 mole) to a temperature of 130–140° C. where water distilled off. The esterification was not complete so toluene (100 ml.) was added along with 1.0 g. p-toluene sulfonic acid and butoxy acetic acid (39.6 g., 0.3 mole), enough to esterify the second OH group of neo-pentyl glycol. Within four hours at reflux, the expected quantity of water was collected. The mixture was washed with sodium carbonate, filtered, and the toluene distilled. The product ester

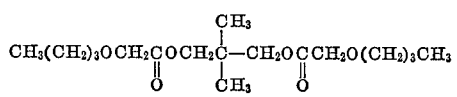

had a saponification number of 318 (theoretical 348). The product ester's viscosity was measured at several temperatures: 0° C.=45 centipoises (cps.); 50°C.=5.7 cps.; and at 100° C.=3.0 cps. The ester's hydrolytic stability was measured at room temperature and revealed only 0.018 meq. H+/g. The ester was (remained) a liquid below —100° F. At —75 to —85° F. it was a clear viscous liquid and at —50 to —60° F. it was only slightly viscous.

EXAMPLE 2

Butoxy acetic acid (79.2 g., 0.8 mole) was heated to 250° C. in the presence of pentaerythritol (79.2 g., 0.8 mole). No catalyst was used. At 125–145° C. a water white homogeneous solution resulted and water began distilling off. After 11 ml. water was collected by holding the solution at 250° C. for 10 minutes, the solution (reaction mixture) was cooled and xylene added and again heated to reflux. Total water collected was 12 ml., but some remained in the condenser. The xylene was removed by distillation and the ester heated to 250° C. again for 25 minutes. Yield of crude ester was 104.0 g. (theoretical 108.0 g.). The ester

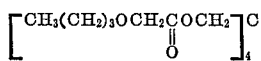

had a saponification number of 365 (theoretical 378). The ester's viscosity at 0° C.=709 cps.; at 50° C.=22.5 cps.; at 100° C.=6.0 cps. The ester's hydrolytic stability at room temperature revealed only 0.034 meq. H+/g. The product ester had a pour point of —35° F.

The esters of our invention are useful as synthetic lubricants and lubricant additives.

We claim:
1. The compound

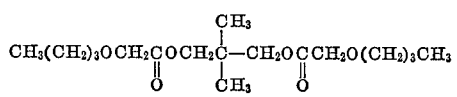

2. The compound

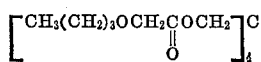

No references cited.

JAMES A. PATTEN, Primary Examiner
P. J. KILLOS, Assistant Examiner

U.S. Cl. X.R.
252—56 S